United States Patent [19]

Matouka

[11] Patent Number: 5,308,154
[45] Date of Patent: May 3, 1994

[54] BRAKING SYSTEM WITH NONBACKDRIVEABLE ACTUATOR

[75] Inventor: Michael F. Matouka, Utica, Mich.

[73] Assignee: General Motors Corporation, Detroit, Mich.

[21] Appl. No.: 912,473

[22] Filed: Jul. 13, 1992

Related U.S. Application Data

[60] Division of Ser. No. 694,286, May 1, 1991, which is a continuation-in-part of Ser. No. 353,320, May 17, 1989, Pat. No. 5,011,237.

[51] Int. Cl.⁵ .............................................. B60T 8/42
[52] U.S. Cl. .............................. 303/115.2; 192/12 BA
[58] Field of Search ............. 303/115 EC, 113 R; 192/12 BA, 8 C:81 C, 26, 35, 38

[56] References Cited

U.S. PATENT DOCUMENTS

| | | | |
|---|---|---|---|
| 1,965,878 | 7/1934 | Briggs | 192/8 C |
| 2,145,666 | 1/1939 | Roethel | 192/8 C |
| 4,651,854 | 3/1987 | Harada | 192/12 BA |
| 4,653,815 | 3/1987 | Agarwal et al. | 303/115 EC |

*Primary Examiner*—Matthew C. Graham
*Attorney, Agent, or Firm*—Ernest E. Helms

[57] ABSTRACT

A vehicle braking system is provided. In a preferred embodiment, the system has an actuator frame with a bore fluidly connected to the wheel brake and to a master cylinder. A piston, mounted within the bore, is operationally associated with a non-rotative nut which is threadably engaged by a power screw. To maximize reaction speed, a high efficiency thread is utilized between the power screw and the non-rotative nut. Therefore, pressure within the actuator can backdrive the piston. To prevent backdriving of the piston, there is a spring locking mechanism. The spring locking mechanism has a driver, a driven member and a coil spring with a loop.

2 Claims, 8 Drawing Sheets

BRAKING SYSTEM WITH NONBACKDRIVEABLE ACTUATOR

The present invention is a division of U.S. Ser. No. 07/694,286, filed May 1, 1991, which is a a Continuation-in-Part of U.S. Ser. No. 07/353,320, filed Jun. 17, 1989, now U.S. Pat. No. 5,011,237.

FIELD OF THE PRESENT INVENTION

The field of the present invention is that of anti-lock braking systems (ABS) for automotive vehicles.

DISCLOSURE STATEMENT

Anti-lock braking systems typically modulate the pressure delivered to a vehicle wheel brake to prevent the vehicle wheel from locking up in the braking condition. Two prior anti-lock braking systems are shown in commonly assigned U.S. Pat. Nos. 4,653,815 and 4,756,391. In both of the aforementioned systems, an electronic controller signals a motor which is gearably engaged with a driven member which is in turn threadably engaged with an actuator piston, piston movement is used to modulate the pressure delivered to the vehicle wheel brake.

SUMMARY OF THE INVENTION

The present invention provides a vehicle anti-lock braking system which is an alternative to the aforementioned anti-lock braking systems. To reduce the space envelope of the aforementioned systems, the present in a preferred embodiment invention provides a piston which is attached to a non-rotative nut which is threadably engaged by a power screw rather than having the piston attached to a non-rotative screw which is engaged by a rotative nut. The above modification allows the present invention to provide anti-lock braking systems wherein the components are smaller and wherein there is less rotative mass, thereby greatly reducing the angular inertia of the system.

Furthermore, in a preferred embodiment, the present invention provides an actuator with a check valve providing an alternative flow pattern from the master cylinder to the wheel brake (cylinder). The check valve is opened by the piston itself. Therefore, there is an alternative flow path to the wheel brake.

To maximize reaction speed, a high efficiency, low friction thread is utilized between the power screw and the non-rotative nut. Therefore, pressure within the actuator can back drive the piston. In the preferred embodiment the present invention is configured in such a manner and that the piston is at its extreme position opens the check valve when the system is not in the ABS mode of operation. The piston can be held with an inefficient screw. However, it has been found preferable to use an efficient screw (to lower the current required by the motor). Therefore, to make the present invention work, there must be some means of holding the piston at its extreme position when it is exposed to master cylinder pressure, but not within the ABS mode wherein the motor is being powered. Space limitations under the hood of an auto require that the solution to the above need take up as little space as possible.

One method to prevent back drive of the piston is to use an electromagnetic brake which restrains movement of the motor. Such an anti-lock braking system is disclosed in U.S. Pat. No. 5,000,523. The present invention provides an anti-lock braking system which is an alternative to that found in Mikhaeil.

It is an object of the present invention to provide an anti-lock braking system.

Other objects and advantages of the present invention can become more apparent to those skilled in the art as the nature of the invention is better understood from the accompanying drawings and a detailed description.

BRIEF DESCRIPTION OF THE DRAWINGS

FIG. 1 is a schematic view show partially in section of a preferred embodiment of the present invention for one vehicle wheel brake;

DETAILED DESCRIPTION OF THE DRAWINGS

The vehicle wheel anti-lock braking system 7 (0 of the present invention includes a master cylinder 12 for supplying pressurized fluid. Connected on the wheel 14 and schematically shown, is a fluid activated wheel brake cylinder 16 (hereinafter referred to as a wheel brake) which receives pressurized fluid from the master cylinder for restraining rotational movement of the wheel 14. The wheel brake 16 may be utilized in a conventional drum or disc type vehicle brake.

An ABS electronic controller 18 is also provided. A sensor 20 in the vehicle wheel brake 16, determines the wheel 14 rotational speed and a sensor (not shown) determines whether or not the brake pedal 22 of the vehicle is activated. Both sensors feed information to the ABS controller 18. The ABS controller 18 will be cognizant of the rotational condition of the wheel and will provide an appropriate signal in response thereto. The signal will place the brake system in an ABS mode of operation if the condition of the wheel 14 is within preset parameters.

A normally open solenoid valve 24, when activated to a closed position in response to a signal given by the controller 18, functions as an isolation valve to prevent fluid communication between the master cylinder 12 and the wheel brake 16. An actuator 28 is provided having an actuator frame 30 with a longitudinal bore 32. An actuator can be provided for each wheel brake of the vehicle or if desired, a plurality of wheel brakes can be connected to a single actuator. The longitudinal bore 32 has a first fluid connection 42 allowing fluid communication with the wheel brake 16 and the longitudinal bore 32 also has fluid communication with the master cylinder 12 when the solenoid valve 24 is not activated to the closed position via passage 40. Additionally, as shown, the longitudinal bore has a second or alternative fluid communicative path with the master cylinder 12. As shown, the bore 32 is midstream of the solenoid valve 4 and passages 42. Fluid flow passes over a transverse slot (not shown) of a piston 44. However, the solenoid valve 24 could directly tie into the wheel brake 16 and passage 42 could "T" into that line. The alternative path 34 has a check valve 38 whose function will be described later. The check valve 38 allows delivery of fluid back to the master cylinder 12 whenever the wheel brake 16 has a pressure greater than that in the master cylinder 16. Therefore, the braking system is sensitive to an operator relieving the brake by removing his or her foot therefrom without any needed input from the controller.

The piston 44 is slidably and salable mounted within the longitudinal bore 32. Movement of the piston 44 provides a variable control volume in communication with the wheel brake 16, thereby modulating the pressure therein. A nut 46 operatively associated with piston 44 is connected with the piston 44 and the nut 46 is slidably mounted within the longitudinal bore 32 in a non-rotative fashion.

A power screw 48 projects into the nut and is threadably engaged therewith in an efficient manner. The power screw has a fixed rotational axis with respect to the actuator frame 30. Powering the power screw is a reversible DC motor 50 which is responsive to the signals given to it by the controller 18. In the position shown, for normal braking operation, the piston 44 is held at the extreme up position and must be held within a tolerance of 3/100 of an inch to maintain the check valve 38 in the open position via the rod 52 (tolerance shown in FIG. 1 greatly enlarged for purposes of illustration).

Figure 2:
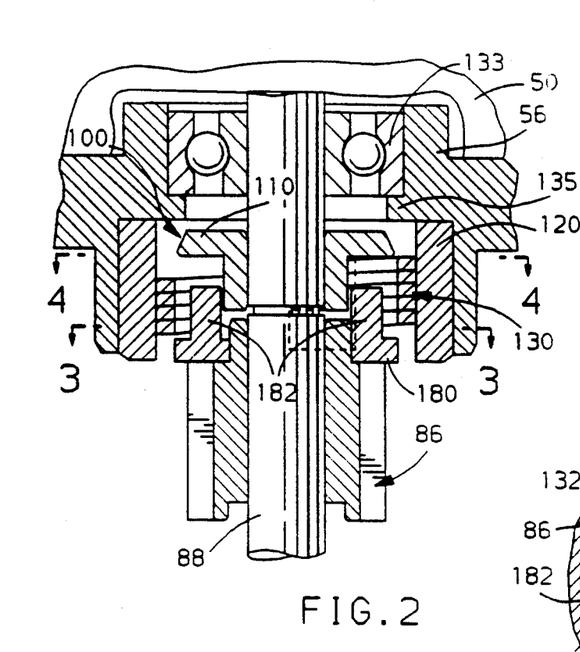
FIG. 2 is a sectional view illustrating details of an anti-lock braking system illustrated in FIG. 1.

The power screw 48 is connected to a gear train 80 which is in turn connected also with the motor 50. The power screw is mounted by bearings and has a end large gear 82 connected to the end thereto. The large gear 82 meshes with an idler gear 84 which in turn meshes with a smaller pinion gear 86. The pinion gear 86 axially floats on a rotor shaft 88 of the motor and is held on by a spring clip (not shown). Fixably connected to the rotor shaft 88 projecting away from the motor is a driver member 100 (herein after referred to as the driver). The driver 100 has a flange portion 110 towards the end of the motor and is symmetrical and rotationally balanced. The driver 100 also has four tang contact surfaces 104 whose function will be described later. The driver 100 has an angular position which corresponds with the position of the rotor shaft 88.

Generally surrounding the driver 100 and located between the motor and the power screw (in the example shown) adjacent to the DC motor is a sleeve 120 having a location generally fixed with respect to the motor 50.

The sleeve 120 has a generally smooth sliding surface on the interior and has an inner diameter of a first value. A spring 130 which has a free outer diameter of a second value equal to or greater than said first value is captured within the non-rotative sleeve 120. The coil spring 130 at both ends has a generally radially inward, projecting tang 132 with a radius curvature equal to the spring thickness. The tangs 132 will project inward intersecting a line tangent with the sleeve 120 at angle less than 90 degrees and at their inner most radial portion 134 have a generally straight section 136. Typically, the spring will be made with piano wire with a square or rectangular cross-sectional shaped area.

The motor's housing 56 has a three diameter inner bore. In the inward inner diameter of the bore a ball bearing 133 is press-fitted therein. The ball bearing 133 mounts the rotor shaft 88. The rotor shaft 88 projects outwards and has the driver 100 keyed, splined, or pressed fitted to it the driver 100.

Separated by a landing 135 in the housing inner bore from the bearing 133 and press-fitted in its third interior diameter is the sleeve 120.

Figure 8:
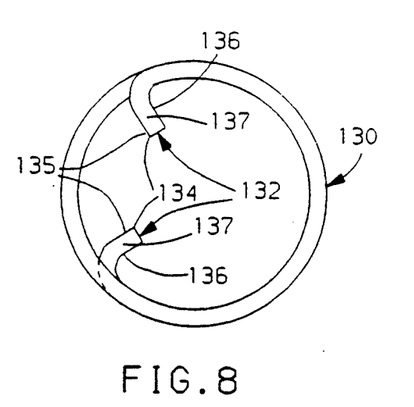
Figure 9:
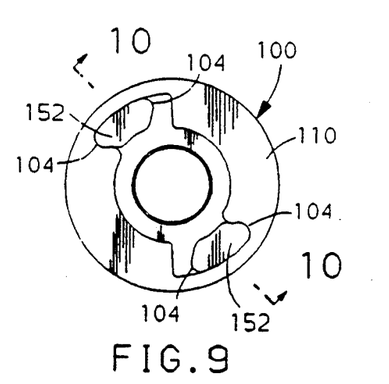
Figure 10:
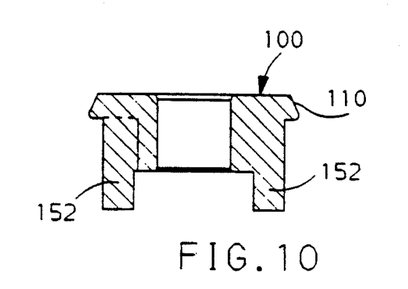
FIG. 10 is a view taken along line 10—10 of FIG. 9.
Figure 11:
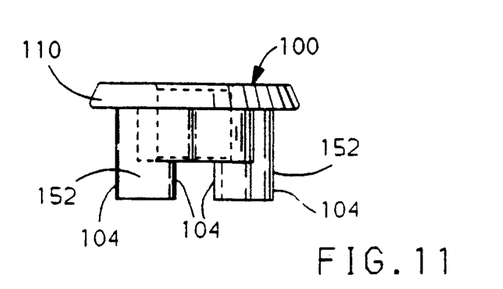
FIG. 11 is a side elevational view of the driver illustrated in FIGS. 2, 6, 9 and 10.

Lockably engaged with the sleeve is the spring 130 with its two radially inward facing tangs 132. The tangs are configured in such a manner that rotation of the driver causes the curved driver tang contact surface 104 to pull the tangs 132 radially inward, thereby causing the multiple-turn spring 130 to contract, and allow the rotor 88 to turn, and therefore transfer torque to the driven pinion gear 86 and thereafter to the power screw 46. The pinion gear 86 is axially slidable upon the end of the rotor shaft 88, however, it has a snap ring (not shown) which connects it thereto. The axial sliding movement is provided so that thermal expansion will not cause the pinion gear 86 to make contact with the sleeve 120 or the motor housing 56. The pinion 86 has a flange 180 and the spring 130 is axially captured between the flanges 110,180 of the driver and the pinion. The pinion gear also has lobe torque transfer portions 182 which project into the sleeve. The lobe sections are contacted by the torque transfer portions 152 of the driver 100 to transfer torque between the members. However, the pinion gear typically will have two 182 lobes but only needs to have one. One pinion 182 lobe must provide a surface to make contact with one of the spring tangs on the opposite end 135 of the tang that the contact surface 104 of the driver makes contact on to cause spring tang 132 to expand outward to lock the motor 50. The locking action is provided in the direction from the piston's extreme position near its fluid connection with the wheel cylinder (As shown in FIG. 1). Therefore, from above-described extreme position, rotating downward or in other word, retractive movement of the piston 44 caused by fluid pressure within the longitudinal bore 32 will cause the lobe 182 on the pinion to hit the spring tang 132 on the opposite side 135 (FIG. 8) that the spring tang is hit by the driver contact surface 104 causing the spring tang to be forced outward expanding the spring and preventing transfer torque from the power screw 48 back to the motor rotor shaft 88 thereby locking the piston in its extreme position within 3/100 of an inch from the top. Therefore, the check valve 38 is maintained in an open position. In most application locking of the location of the piston 44 as from its lower extreme position will not be relevant.

Figure 3:
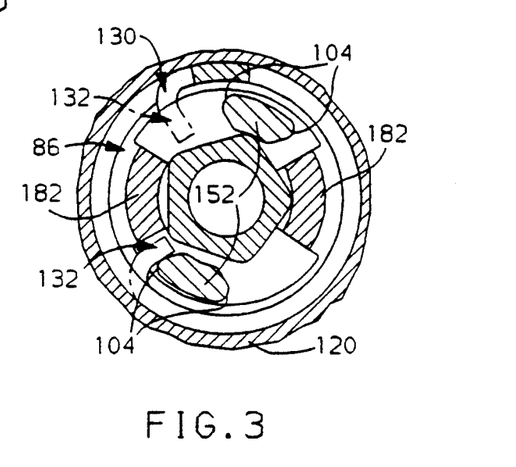
FIGS. 3 and 4 are views taken along lines 3—3 and 4—4 respectively of FIG. 2.
Figure 4:
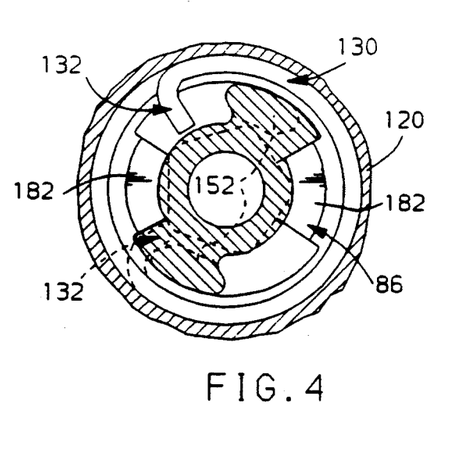
Figure 5:
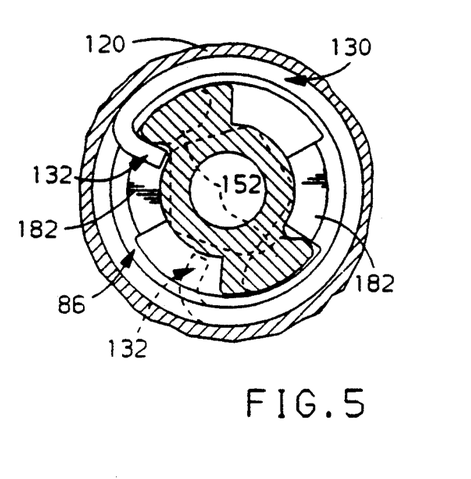
FIG. 5 is a view illustrating the driver rotated from the position shown in FIG. 4.
Figure 6:
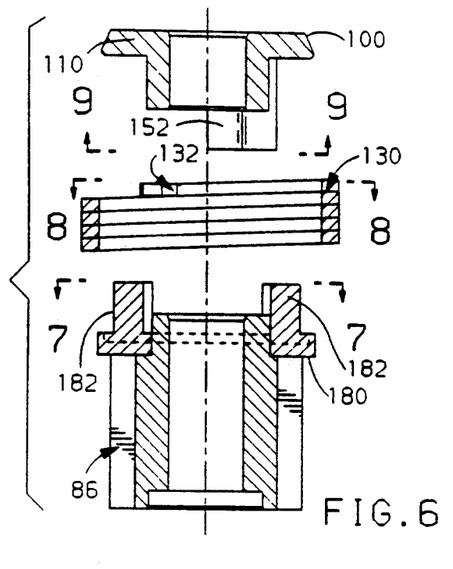
FIG. 6 is an exploded view of the spring driver and pinion gear utilized in the anti-lock braking system of the present invention.
Figure 7:
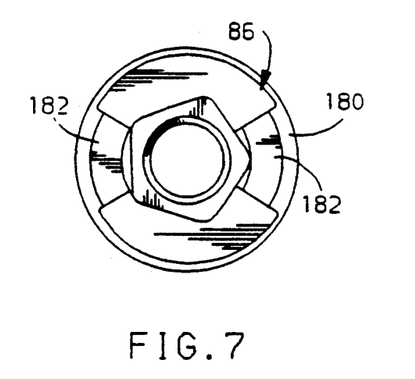
FIGS. 7, 8 AND 9 are views taken along lines 7—7, 8—8 and 9—9, respectively, of FIG. 6.

The spring 130 is configured in such a manner that once one of the rotor shaft 88 (or driver 100) contact surfaces 104 is in contact with the tang 132 the rotor only has to turn approximately 5 more to release the spring 130. The torque transfer portion 152 of the driver 100 will start turning the pinion 86 before the spring contact surface of the pinion (lobe) 182 can contact the tang 132 of the spring. Therefore, when the motor 50 is driving the piston 44 upward, there is isolation of the spring tang 182 from the pinion lobe 182 from a fraction of a degree to approximately 5 degrees in a preferred embodiment of the invention illustrated in FIGS. 3-5. In other words, tang isolation means that the tang is not sandwiched between the driver lobe 152 and the pinion lobe 182.

First, the tang isolation is important in that when the motor 50 is driving the piston 44 the rotor shaft 88 will start turning the pinion 86 before making contact with the spring tang 132 and, therefore, torsional slip between the pinion 86 and the driver 100 will not cause a chattering effect on the tang 132 of the spring 130 (the tang 132 is one of the most critical components in this ABS system in regards to reliability) and, therefore, spring 130 life is preserved. Secondly, when the motor 50 drives the piston 44 to its up extreme position, there is an impact force and the motor 50 will stall. However, instantaneously the actuator frame 30 will be loaded in tension. Instantaneously, the spring tension of the actuator frame 30 will cause a backward force or rearward force on the pinion gear 38, and the pinion gear will rotate slightly before the surface of its lobe 182 will come in contact with the spring tang side 135. The spring isolation allows the pinion gear to back-lash a few degrees to relieve tension of the actuator frame 30 before the pinion lobe locks up against the tang (lock up occurs in 1-5 degrees). Therefore, the pinion 86 can reverse slightly (relieving tension in the actuator frame), however, not as much as to allow the check valve 38 to close. Without the tang isolation, the reverse movement of the pinion 86 would not be possible. Without tang isolation the spring tang 132 will be instantly loaded and the piston 44 will remain in compression and in a position of tension loading the actuator frame 28 which places the whole gear train 80 under a high retained load in the non-ABS mode of operation (normal brake operation).

The spring contacting surface 104 of the driver is configured in such a manner as to impact a force to the tang normal to the generally straight portion 134. The rounded surface 104 provides almost point contact, imparting a force which also goes through the center of percussion 137 of the tang 132. Therefore, vibration of the tang 132 with respect to the driver contact surface 104 is minimized and tang 132 life is prolonged. The inward bend of less than 90 helps to prevent any tendency of the tang to straighten out since the surface 136 is less than 90 from the tangent. In other words, there is a small component of force directed inwards which tends to pull the spring away from the sleeve. It has also been found to be preferable that the radius of the tang 132 bend be in the neighborhood of 1 times the thickness of the wire of the spring 130 measured in the radial direction.

Figure 12:
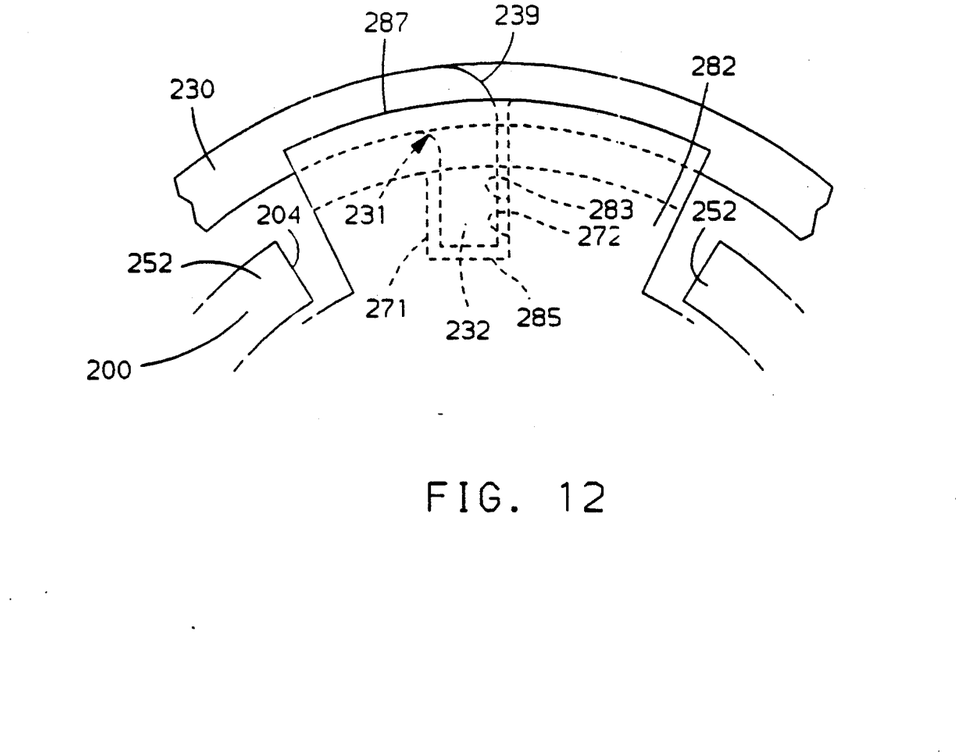
FIGS. 12, 13, 14, 15, 16, 17, 18, 19, 20, and 21 illustrate alternative preferred embodiments of the present invention.
Figure 13:
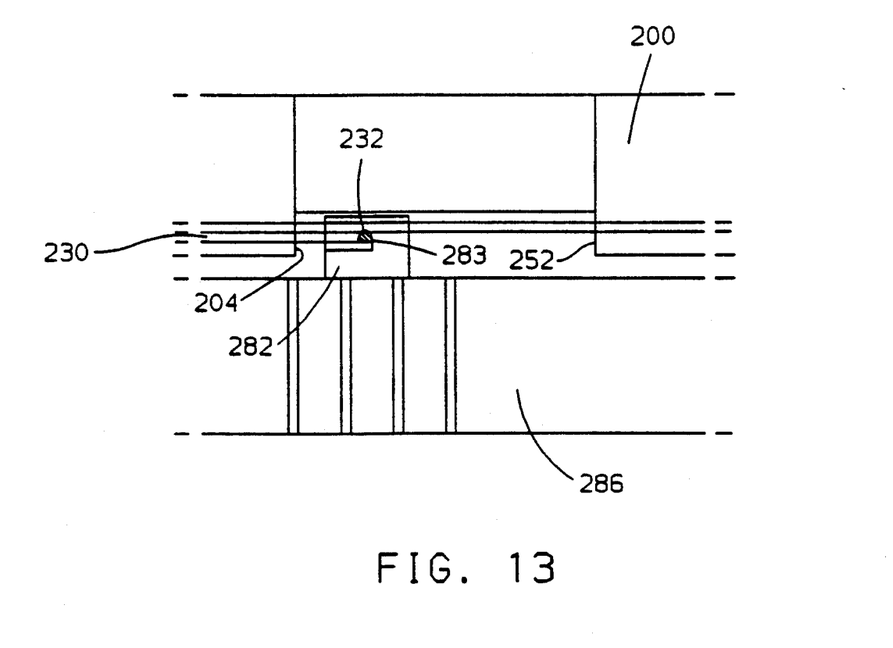

FIGS. 12 and 13 illustrate an alternative preferred embodiment of the present invention. FIG. 12 being a top elevational view and FIG. 13 being a rolled out view of the alternative driver 200, spring 230, and gear 286. In the embodiment of FIG. 12 and 13 a first tang (not shown) which is generally most adjacent to the electric motor is as previously described. The gear 286 has a tab 282 with a generally radial hole 283 typically shaped in a diverging or conical fashion with its largest dimension 285 radially inward. The second tang 232, as shown in FIG. 12, is inserted within the hole 283 of the nesting tab 282. The spring 230 is now restrained in position by the gear and its snap ring (not shown) which results in several benefits. One advantage is that no flange is now required on the driver to retain the spring axially within the nonrotative sleeve. Installation of the spring 230 is fairly easy and the spring 230 can now be removed without removing the driver 200. The gear nesting tab outer diameter 287 typically is raised radially outwardly so that it contacts the second tang 232 near its knee 239 without fear of it hitting an adjacent spring turn or missing contact altogether with the tang 32. Therefore, bending stress in the second spring tang 232 is greatly reduced. The nesting hole 283 of the gear tab prevents load stresses from bending the second spring tang beyond its generally 90 degree bend and also prevents any tendency for the driver 200 to unbend the tang 232 thus reducing the stress in the opposite direction wherein the tang is being pushed to unlock the spring within the nonrotative sleeve. Stress reduction may be so great that it may be possible to utilize round wire which is typically cheaper and easier to work with. Additionally, the tang is precisely located with this approach and the amount of overlap of the driver and gear tabs 252,282 can be considerably minimized thus reducing driver and gear bending torques and shortening the overall assembly. In operation to release the tang 232 a tab 252 of the driver will make contact with the nesting tab 282 of the gear and therefore transfer torsion from the driver 200 to the gear 286 while at the same time causing the gear nesting tab 282 to release the spring 230 from its locked condition causing a first side 271 of the hole to make contact with the second spring tang 232. Torsion transfer from the gear 286 to back-drive the driver 200 is prevented since the opposite side 272 of the gear tab nesting hole 283 will hit the tang 232 causing it to expand and lock up as mentioned in the previous examples. Another advantage of the configuration is that in one direction the driver 200 imparts force to the tang 232 through the gear tab 282 and therefore the tang 232 is isolated from the driver tab (second contact surface) 204. Also, since the nesting tab 282 makes contact with the second tang 232 closer to the second tangs outer diameter there is less stress induced upon the tang. As noted in FIG. 12, the tang radius 'R' 231 should be held to the minimum value possible.

Figure 14:
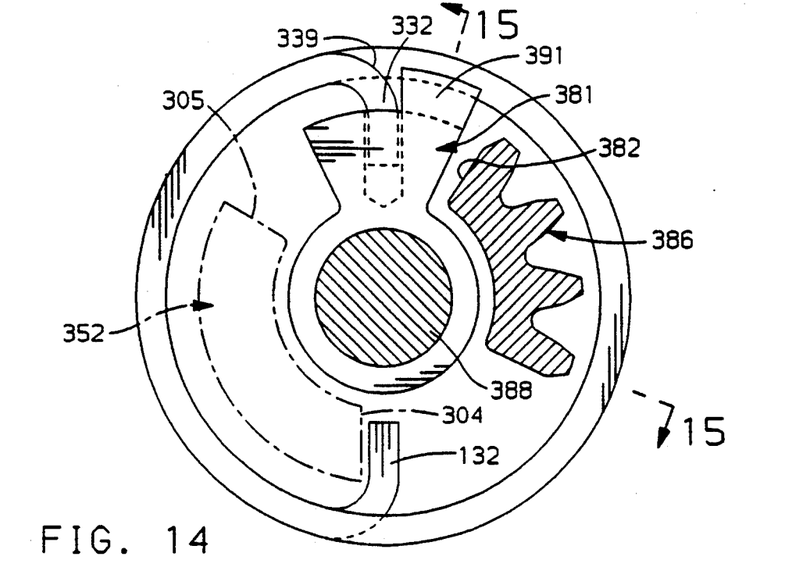
Figure 15:
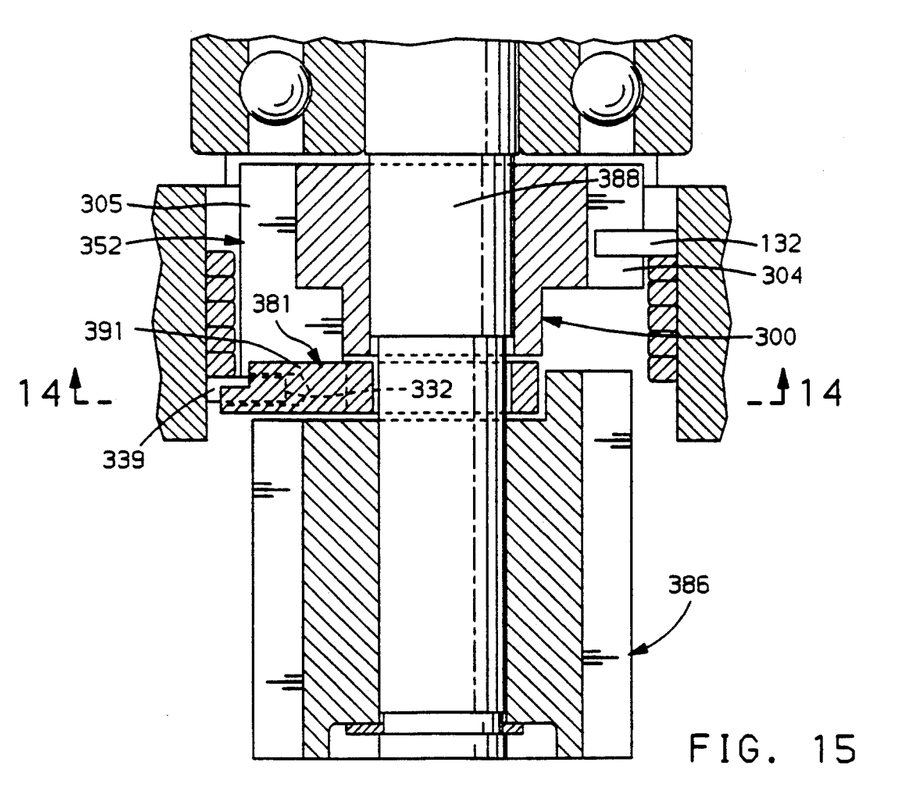

Referring to the embodiment shown in FIGS. 14 and 15 there is added juxtaposed between the driver 300 and the gear 386 a nesting washer for the second tang 332. The nesting washer 381 can rotate around the motor shaft 388 independent of the motion of the driver 300. The washer fits loosely on the motor shaft 388 and as mentioned previously is captured between the driver 300 and the gear 386. The washer has a raised portion called the washer tab 391 which is somewhat radially outward and within the tab 391 is a radial hole which captures the spring tang 332 (as in a manner similar to FIG. 12). The above allows the washer tab 391 to contact the second tang 332 at a point closer to its knee 339 when the gear second contact surface 382 makes contact on the nesting washer 391 to prevent the torque from the gear 386 being transferred to the driver 300 via the driver torsion transfer portion 352. The driver first contact surface 304 engages the first spring tang 132 which is more adjacent to the motor shaft 388 in a manner as previously described for the previous embodiments, but for movement in the opposite second direction the driver torsion transfer portion 352 imparts movement to the tang washer 381 to cause the tang washer 381 to move in a direction to impart force upon the second tang 332 in a direction to release the tang allowing torsional transfer from the driver 300 to the tang washer 381 and to the gear torsion transfer portion 382 thereby allowing the driver 300, tang washer 381 and gear 300 to move in unison.

This configuration provides several advantages. Again, no flanges are needed on the driver for spring retention and installation is fairly easy. Again, the spring can be removed without removing the driver and the other advantages are similar to that of the previously explained embodiment. However, an additional advantage is that the washer now allows independent movement of the gear with respect to the driver. Additionally, when the gear 386 is imparting force to the second spring tang 332 in a locking condition, the washer extension 391 allows contact with the second spring tang 332 radially more outwardly, thereby providing less of a tendency for the spring tang 332 to be bent inwardly than when the gear contact surface 392 make direct contact with the second tang 332.

Figure 16:
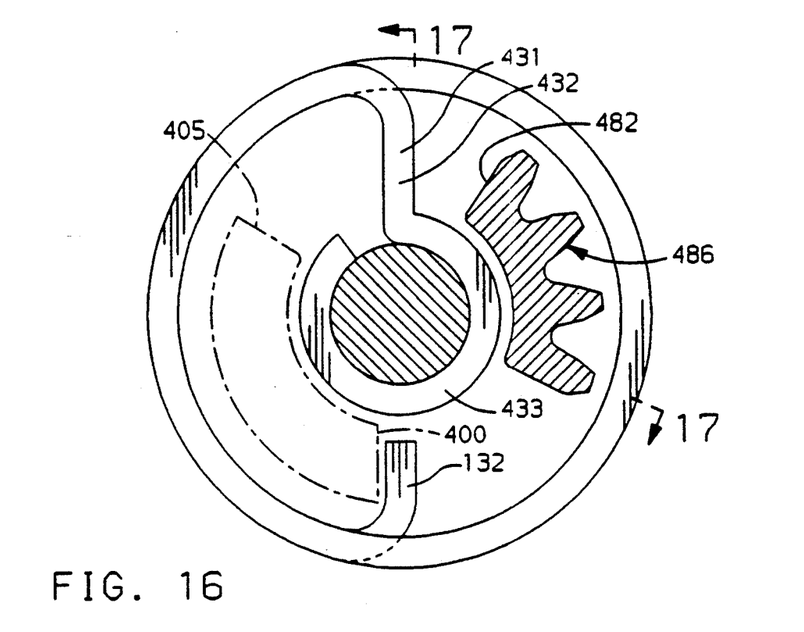
Figure 17:
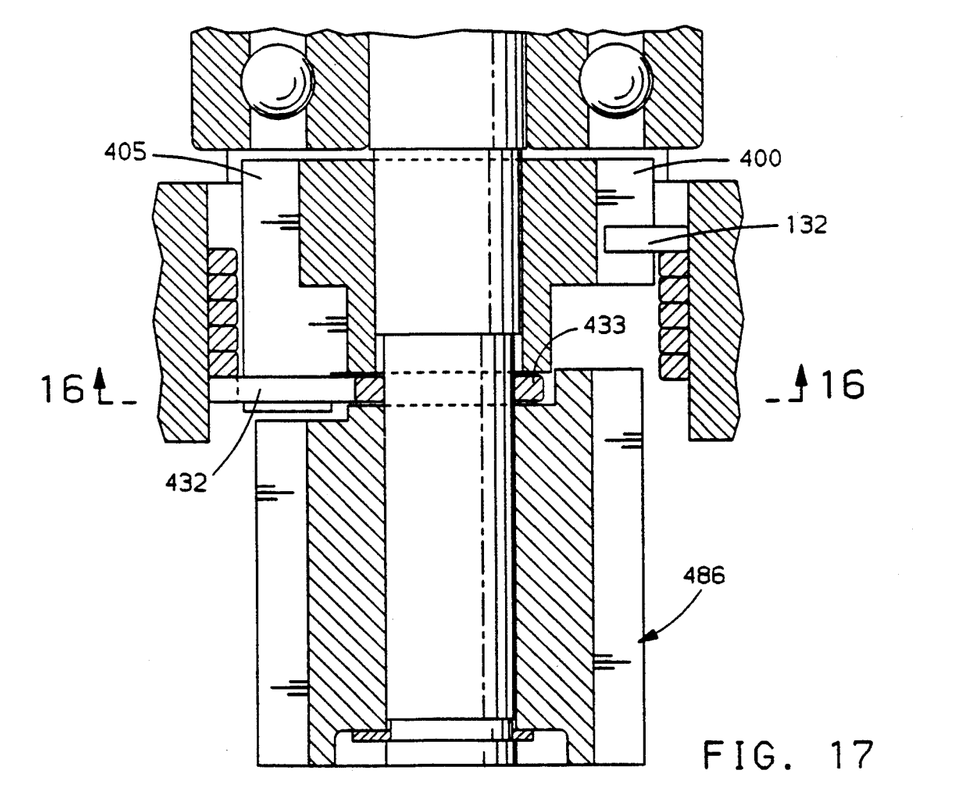

Referring to FIGS. 16 and 17, there is provided another version of the tang arrangement. As in prior versions the driver 400 makes contact with the first tang 132 in a manner similar to that previously described. However, the second tang 432 is comprised of a generally radial portion 431 which is connected with a loop portion 433 which loops around the motor shaft. This loop version has most of the advantages of the version previously described with the tang washer but is further advantageous in that it eliminates the tang washer. The generally radial portion 431 of the second tang 432 provides a surface for impartation of forces from either the driver contact surface 405 or the gear contact surface 482. And the loop version of the second tang also allows some independent movement of the gear 486, the spring and driver 400 with respect to one another.

Figure 18:
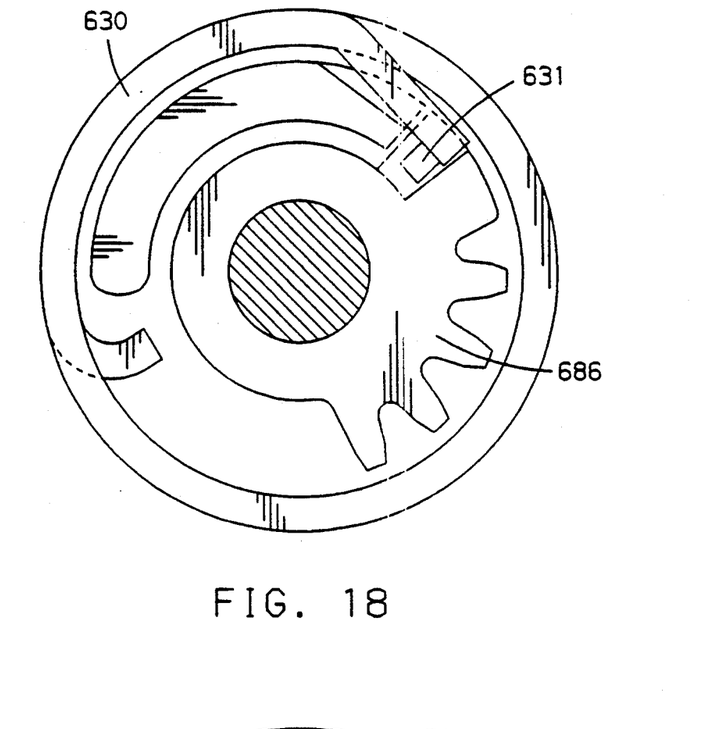
Figure 19:
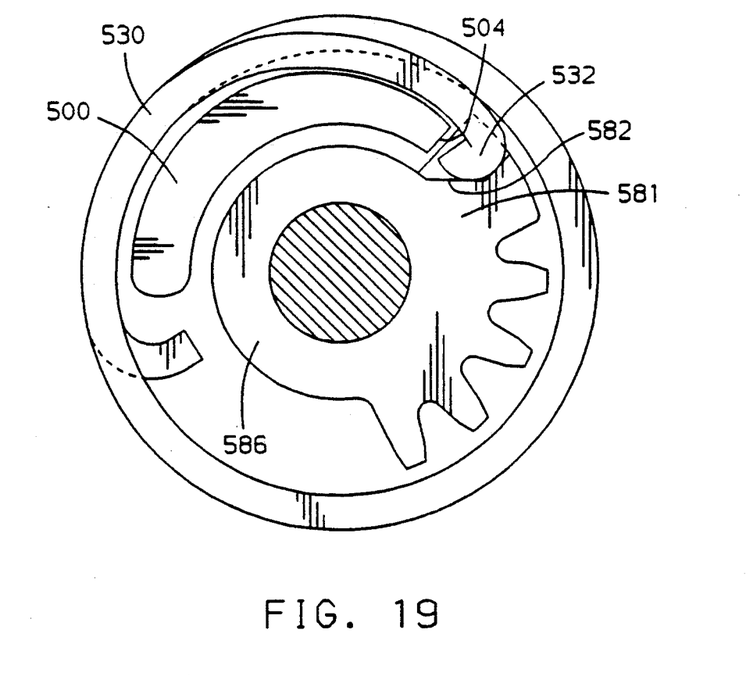

FIGS. 18 and 19 again illustrate alternative versions of the second tang. In these versions the last partial turn of the spring 530 1630 leading to the second tang has a slightly smaller inner diameter. In the version of FIG. 19 there is provided a wedging nest upon a tab 581 of the gear 586 for making contact with the secondary spring tang 532. The tang itself has a contracting mass formed from a 180 degree bend and is contacted by a modified driver 500 second contact surface 504 which has a blunt end which traps the tang 532 within the wedge nest 582 of the gear tab 581 to release the secondary tang and to power the gear 586. When the gear 586 is imparting force upon the second spring tang 532 to cause such tang 532 to lock within the nonrotative sleeve to prevent transfer of torque, the gear 586 imparts a force upon the spring 530 which is almost tangential and therefore places less stress on the tang 532 and more in a direction that is nearly ideal (tangential to the spring diameter). The 'V' groove of the gear tab nest positions the second tang and prevents it from wedging from between the gear 586 and the inside diameter of the spring sleeve 120. In the version of FIG. 18 which is substantially similar to that shown in 19, the wire spring 630 is abruptly bent and on it a welded-on short piece of wire 631 contacting mass eliminates the requirement for the 180 degree bend at the second tang end. This version will almost totally eliminate any tendency for bowing of the spring adjacent to the tang 632 when the gear 686 is imparting force to the second tang.

Figure 20:
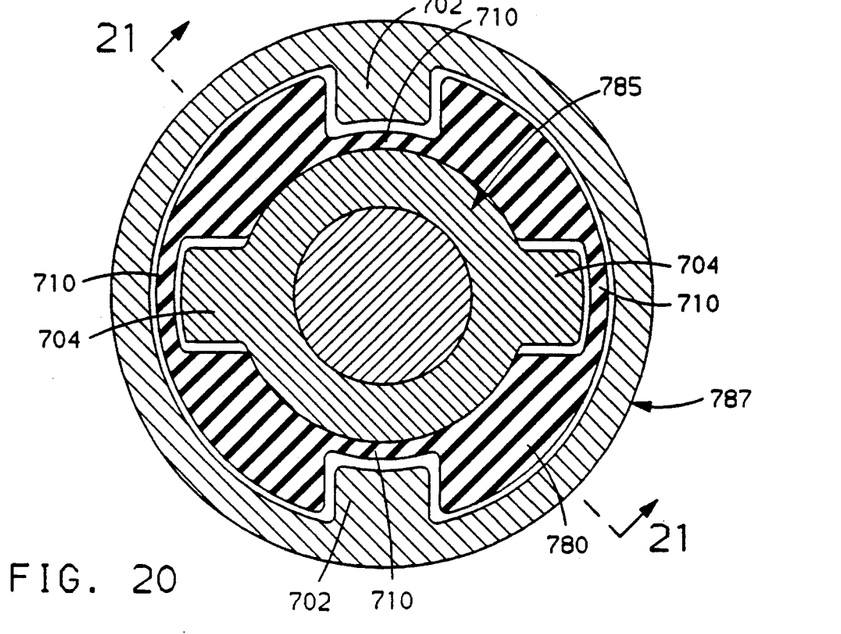
Figure 21:
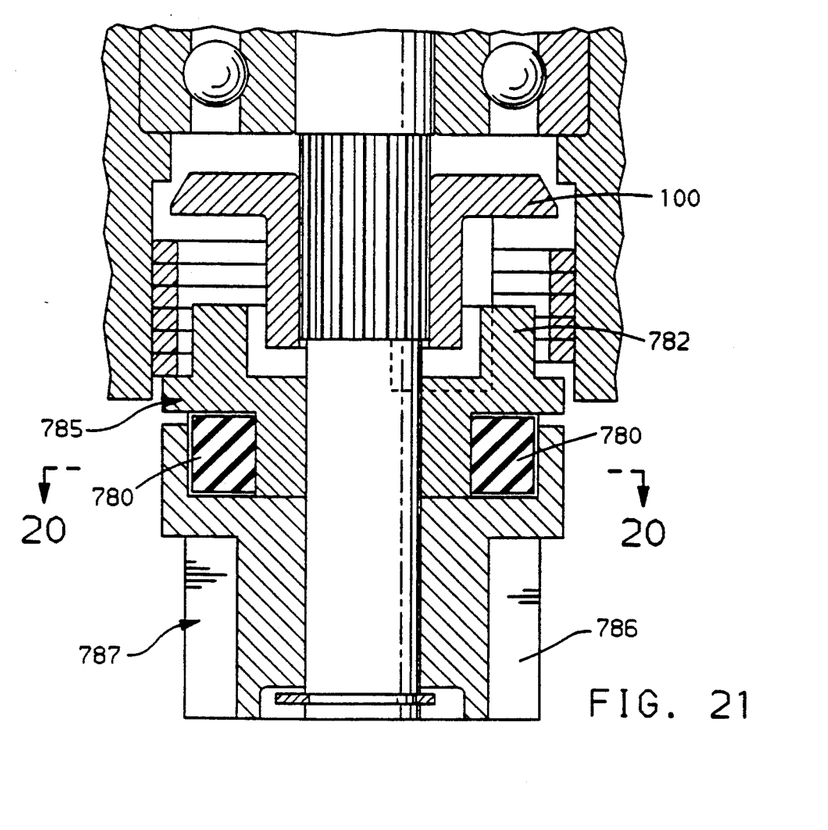

FIGS. 20 and 21 illustrate a modification of the present invention more akin to that shown in FIGS. 1 through 11 wherein the gear 786 is comprised of two separate rigid pieces 785,787 which have juxtaposed between them in an elastomeric torsion spring member 780. The gear member 786 with the teeth has two lugs 702 which are geometrically opposed to two lugs 704 of the other gear member 785 which is connected with the contact surfaces 782 of the gear. Placed between these lugs and joined by webbing 710 is the elastomeric torsion member 780. It has been found that a slight clearance between the torsion member 780 and the lugs 702,704 provides better torsional damping characteristics. These characteristics mainly come into play when the power screw 48 is driving the nut 46 to its extreme positions within the bore 32 of the actuator 28. It has been found that utilization of this torsional damping system significantly diminishes problems of strain within the system caused by the nut 46 reaching an extreme position with respect to the bore 46 while the motor 50 is still continuously running and therefore prolongs the life of the overall anti-lock braking system.

While embodiments of the present invention have been explained, it will be readily apparent to those skilled in the art of the various modifications which can be made to the present invention without departing from the spirit and scope of this application as it is encompassed by the following claims.

I claim:
1. An anti-lock braking system for a wheel of an automotive vehicle comprising:
   master cylinder means for supplying pressurized fluid;
   sensor means to determine a rotational speed of the wheel;
   a wheel brake means receiving pressurized fluid from said master cylinder means and for restraining rotational movement of said wheel;
   an anti-lock braking controller cognizant of the rotational condition of said wheel via the sensor means and providing a signal when the rotational condition of said wheel is within present parameters;
   an actuator frame having a bore with means of fluid communication with said wheel brake means;
   a piston slidably sealably mounted with said bore for providing a variable control volume in communication with said wheel brake means and thereby modulating the pressure therein;
   a nut operatively associated with said piston and slidably mounted within said bore in a non-rotative fashion;
   a power screw projecting into said nut and threadably engaged within in a low friction, backdriveable manner, said power screw having a fixed rotational axis with respect to said actuator frame;
   reversible motor means for powering said power screw, said motor means being responsive to signals given by said controller;
   a non-rotative sleeve located between said power screw and said motor means in a fixed position, said sleeve having an inner diameter of a first value;
   a coil spring having a free outer diameter of a second value generally equal to or greater than said first value, said coil spring being captured within said non-rotative sleeve, and said coil spring having a tang a first generally radial tab and a second tab with a generally radial portion connected with a loop;
   a driver member with a torsion transfer portion projecting into said non-rotative sleeve, said drive member having a rotational axis passing though said loop, said driver member having an angular position in correspondence with the angular position of said motor means, said driver member having first and second contact surfaces for engagement with said respective first and second spring tangs to cause said tangs to release and to allow said spring to have sliding movement within said non-rotative sleeve in both directions;

a driven member with an angular position in correspondence with the angular position of said power screw, said driven member having a rotational axis generally coterminous with said rotational axis of said driver member and said driven member having projecting into said sleeve a torsion transfer portion for making contact with said driver member torsion transfer portion for transferring torque from said driver member to said power screw, said driven member having at least one contact surface for making contact on one of said second spring tang on the opposite side of said spring tang said driver contact surface makes contact on to cause said spring to radially expand and lock within said sleeve to prevent torque from said power screw being transferred to said motor means when said piston is moving away from a position more adjacent to said actuator frame bore means of fluid communication with said wheel brake means by fluid pressure within bore.

2. A braking system for a wheel of an automotive vehicle comprising:

master cylinder means for supplying pressurized fluid;

sensor means to determine a rotational speed of the wheel, a wheel brake means receiving pressurized fluid from said master cylinder means and for restraining rotational movement of said wheel;

a controller cognizant of the rotational condition of said wheel via the sensor means and providing a signal when the rotational condition of said wheel is within present parameters;

an actuator frame having a bore with means of fluid communication with said wheel brake means;

a piston slidably sealably mounted with said bore for providing a variable control volume in communication with said wheel brake means and thereby modulating the pressure therein;

a nut operatively associated with said piston and slidably mounted within said bore in a non-rotative fashion;

a power screw projecting into said nut and threadedly engaged within a low friction, backdriveable manner, said power screw having a fixed rotational axis with respect to said actuator frame;

reversible motor means for powering said power screw, said motor means being responsive to signals given by said controller;

a non-rotative sleeve located between said power screw and said motor means in a fixed position, said sleeve having an inner diameter of a first value;

a coil spring having a free outer diameter of a second value generally equal to or greater than said first value, said coil spring being captured within said non-rotative sleeve, and said coil spring having a first tang on one end and a second tang on another end;

a coil spring having a free outer diameter of a second value generally equal to or greater than said first value, said coil spring being captured within said non-rotative sleeve, and said coil spring having a tang, a first generally radial tab and a second tab with a generally radial portion connected with a loop;

a driver member with a torsion transfer portion projecting into said non-rotative sleeve, said driver member having a rotational axis passing through said loop, said driver member having an angular position in correspondence with the angular position of said motor means, said driver member having first and second contact surface for engagement with said respective first and second spring tangs to cause said tangs to release and to allow said spring to have sliding movement within said non-rotative sleeve in both directions;

a driven member with an angular position in correspondence with the angular position of said power screw, said driven member having a rotational axis generally coterminous with said rotational axis of said driver member and said driven member having projecting into said sleeve a torsion transfer portion for making contact with said driver member torsion transfer portion for transferring torque from said driver member to said power screw, said driven member having at least one contact surface for making contact on said second spring tang on the opposite side of said spring tang said driver contact surface makes contact on to cause said spring to radially expand and lock within said sleeve to prevent torque from said power screw being transferred to said motor means when said piston is moving away from a position more adjacent to said means of fluid communication of said actuator frame bore with said wheel brake means by fluid pressure within bore.

* * * * *